(No Model.)

J. L. BLACKSTOCK.
CHURN.

No. 254,909. Patented Mar. 14, 1882.

WITNESSES:
Theo. G. Hoster
C. Sedgwick

INVENTOR:
J. L. Blackstock
BY Munn & Co
ATTORNEYS.

United States Patent Office.

JOHN L. BLACKSTOCK, OF STEPHENVILLE, TEXAS.

CHURN.

SPECIFICATION forming part of Letters Patent No. 254,909, dated March 14, 1882.

Application filed December 9, 1881. (No model.)

*To all whom it may concern:*

Be it known that I, JOHN L. BLACKSTOCK, of Stephenville, in the county of Erath and State of Texas, have invented a new and Improved Churn-Motor, of which the following is a full, clear, and exact description.

The object of my invention is to provide a cheap, durable, and easily-operated motor for dash-churns, and one the length of stroke of which can be varied to suit the size of the churn and the quantity of cream to be churned.

My invention consists of a dash-lever, connecting-rod, crank and pulley shaft, and large drive-wheel, the dash-lever being made adjustable as to its length of stroke.

Reference is to be had to the accompanying drawings, forming part of this specification, in which similar letters of reference indicate corresponding parts in both figures.

Figure 1:
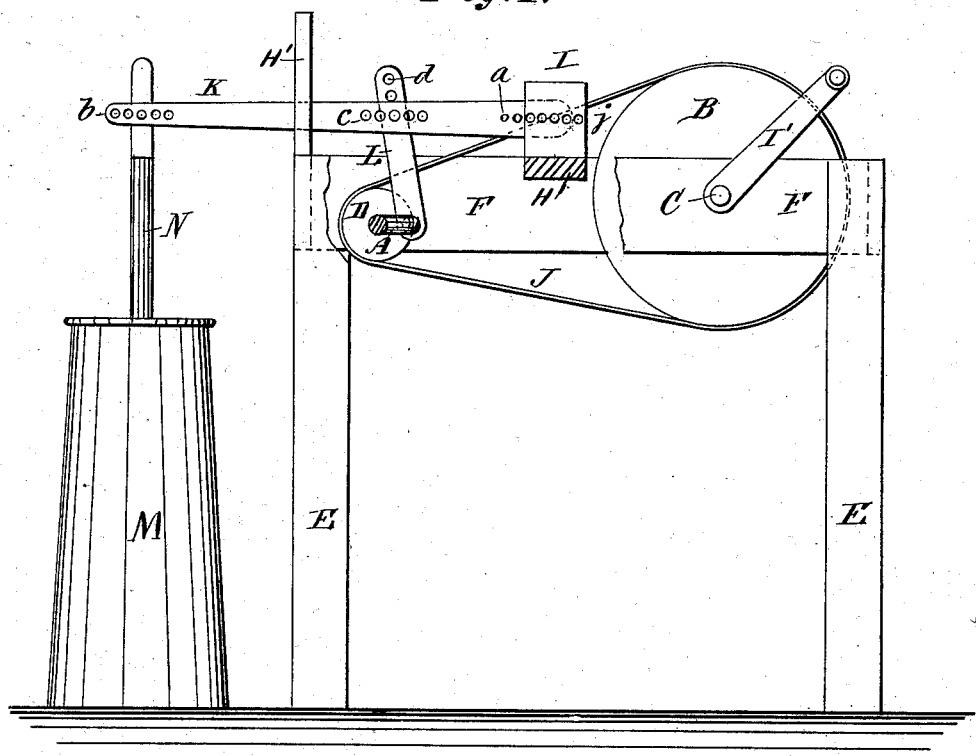
Figure 2:
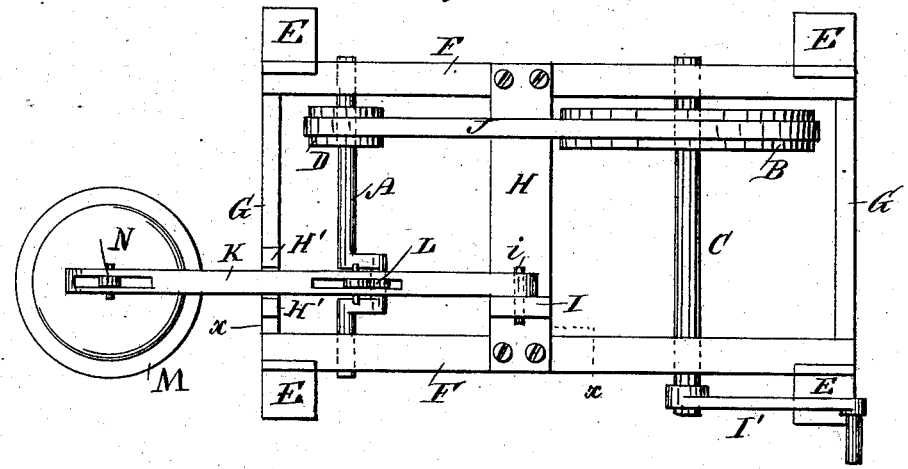

Figure 1 is a sectional elevation of my invention. Fig. 2 is a plan view of the same.

The frame of the motor is composed of the legs E, side and end bars, F and G, cross-piece H, guide-arms H', and the short vertical board I, which is formed with the series of holes $j$, as shown.

B is the drive-wheel, placed upon the shaft C, which is turned by the hand-crank I', and A is the crank-shaft, provided with the pulley D, over which the belt J from the drive-wheel passes. This crank-shaft is connected to the dash-lever K by means of the connecting-rod L. The rear end of the dash-lever is formed with the series of perforations $a$, by means of which it is adjustably fulcrumed to the vertical board I by the pin $i$. (Shown in Fig. 2.) The outer end of this dash-lever is formed with the series of holes or perforations $b$, by means of which it is adjustably attached to the upper end of the dasher N of the churn M, as shown; and the center of the said dash-lever is formed with the series of holes $c$, by means of which it is adjustably attached to the connecting-rod, which is also formed at its upper end with a series of holes, $d$, so that the connection can be changed to suit the length of stroke to which the lever may be adjusted. By this means it will be perceived that the motor may be adjusted to exactly suit the different sizes of churns, and also to suit the quantity of cream in the churn. Besides, the motor is cheap, easily made, and effective in its work, and occupies small space when not in use.

Having thus fully described my invention, I claim as new and desire to secure by Letters Patent—

1. In a churn-motor, the dash-lever K, formed with the series of holes $a$, $b$, and $c$, in combination with the vertical board I, formed with the series of holes $j$, and the connecting-rod L, formed with the series of holes $d$, substantially as and for the purposes set forth.

2. In a churn-motor, the combination, with the rectangular frame E F G, the cross-bar H, the drive-wheel B, and the crank-shaft A, provided with the pulley D, of the vertical board I, provided with the series of holes $j$, the dash-lever K, provided with the series of holes $a$ $b$ $c$, the connecting-rod L, provided with the series of holes $d$, and the guide-arms H', substantially as and for the purpose set forth.

JOHN LAFAYETT BLACKSTOCK.

Witnesses:
 ELI R. KIKER,
 WOODARD TOLER.